Dec. 18, 1956  L. O. PAULSEN ET AL  2,774,856
BUOYANT RING HEATER FOR ICE FISHING
Filed July 7, 1955
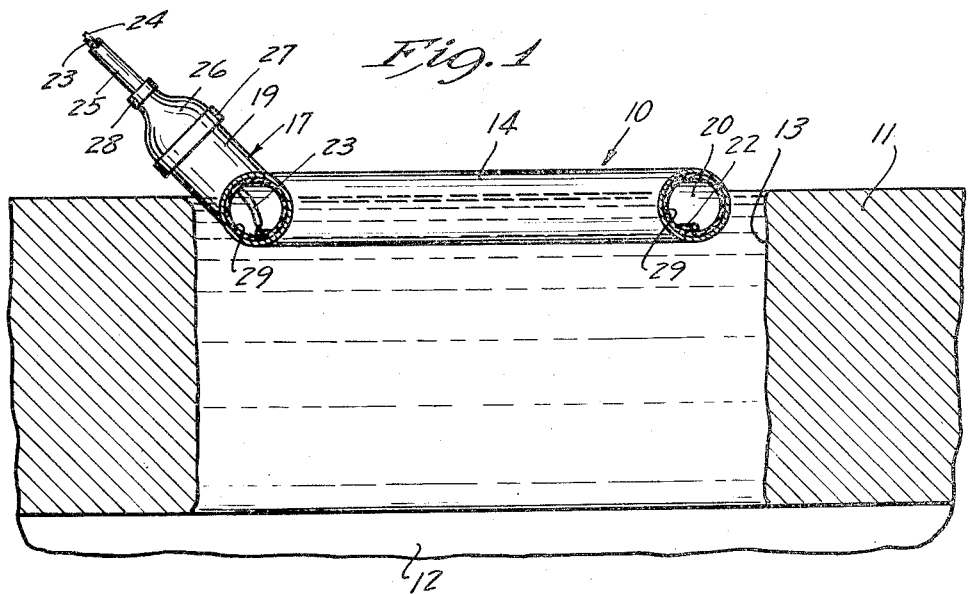
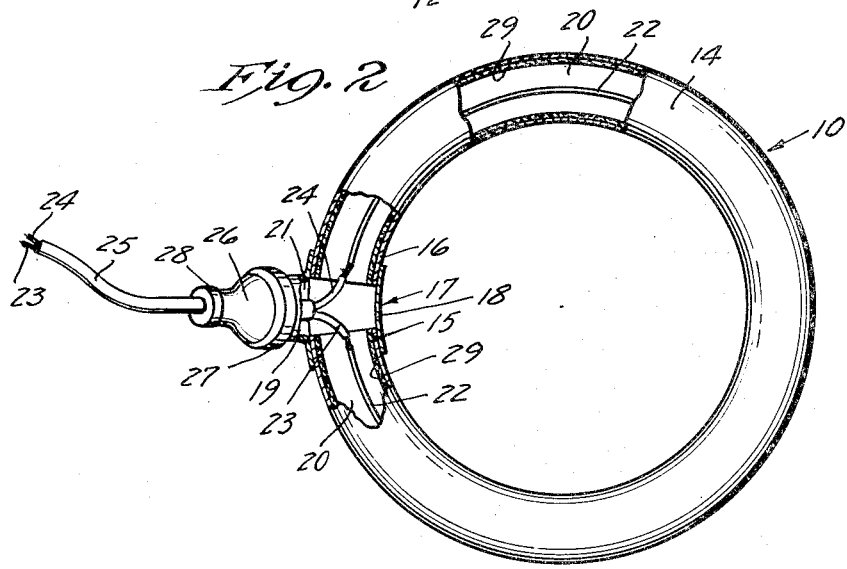
INVENTORS
LLOYD O. PAULSEN
CLARENCE O. CHRISTENSEN
BY
ATTORNEYS

2,774,856

Patented Dec. 18, 1956

2,774,856

BUOYANT RING HEATER FOR ICE FISHING

Lloyd O. Paulsen and Clarence O. Christensen, Isle, Minn.

Application July 7, 1955, Serial No. 520,548

4 Claims. (Cl. 219—41)

Our invention relates to a buoyant ring heater for keeping ice fishing holes open.

An object of our invention is to provide novel and improved heater means for maintaining ice fishing holes open.

Another object of our invention is to provide a device of the class described which is simple yet rugged and durable in construction, and which is simply and effectively operated.

A further object of our invention is to provide a ring heater having an outside diameter that fits freely into an ice fishing hole and which is buoyant so that it floats about two thirds submerged to locate the heater at the most effective place; and this ring-shaped heater permits free access to the water through its open center, the fish line being dropped through the center, so that our invention will not obstruct or hinder fishing through the ice hole.

These and other objects and advantages of our invention will become apparent in the course of the following specification and claims, reference being had to the accompanying drawings wherein:

Fig. 1 is a view partly in elevation and partly in vertical section of our invention in operative position in an ice hole; and Fig. 2 is a view in plan of our invention, some parts being broken away and some being in section.

Referring more particularly to the drawings, our invention is a buoyant ring heater which is indicated in its entirety by the general reference numeral 10. A layer of ice formed at the top of a body of water 12 has a conventional generally cylindrical ice hole 13, extending downwardly therethrough from atmosphere to the unfrozen water 12.

Heater 10 comprises an open-ring shaped tube 14 having its opposite ends 15 and 16 disposed adjacent each other so that tube 14 is substantially ring-shaped but not continuous. A T fitting 17 comprises a sleeve portion 18 and a laterally projecting tubular leg 19. The opposite ends of sleeve portion 18 telescopically engage ends 15 and 16 of tube 14 and are rigidly secured thereto in fluid-tight relationships by welding or the like. Sleeve portion 18 of T fitting 17 defines with tube 14 a ring-shaped tubular casing which encloses and/or defines an annular chamber 20. Tubular leg 19, in the nature of a snout, projects generally upwardly and outwardly from sleeve portion 18 and casing 14 when ring heater 10 is in its operative position, as shown in Fig. 1; and leg 19 defines an inlet passageway 21 into the annular chamber 20.

We provide a heater comprising a resistance wire loop 22 disposed in annular chamber 20 and having its opposite ends disposed in spaced relationship adjacent the inlet passageway 21.

Individually insulated lead-in wires 23 and 24 are bound together by the outside insulation 25, as is conventional; and lead-in wires 23 and 24 extend through snout or lateral leg 19 to be each conductively connected to a different one of the ends of loop 22. Lead-in wires 23 and 24 are adapted to be connected to a source of current, which preferably may be the fisherman's car battery. The heater comprising loop 20 being of a resistance wire type will not be a serious drain on the car battery.

We provide a removable sealing cap, indicated by the numeral 26 which is substantially funnel-shaped and has collar portions 27 and 28 at its opposite ends. Collar portion 27 encompasses the outer end of lateral leg 19 and engages it in fluid-tight relationship, and similarly collar 28 encompasses and engages outer insulation 25 of lead-in wires 23 and 24 in fluid-tight relationship; whereby, sealing cap 26 forms a watertight closure of inlet passageway 21. Cap 26 is in the nature of an extension of the snout formed by lateral leg 19; and preferably cap 26 is formed of rubber so that collars 27 and 28 may tightly, yet yieldably so that the cap is removable, grip the outer end of leg 19 and outer insulation 25 respectively, in sealing relationships as aforementioned.

Tube 14 is provided with an electrical insulating lining which preferably comprises a tubular electrical insulating liner 29 which adjoins the inner surface of tube 14 throughout its entire circumferential length between ends 15 and 16 thereof. The outside diameter of tube 14 is such that ring heater 10 will freely fit in ice hole 13 but preferably with only a slight clearance so that there is little lateral play thereof, as shown in Fig. 1. Ring heater 10 is buoyant to the extent that it will be approximately two-thirds submerged when floating in the water so that it is located right at the surface where the heater will be most effective for a given current consumption. The fish lines are dropped through the open center of ring heater 10; and it is clear that our novel and improved ring heater 10 will not obstruct or hinder fishing through the ice hole 13 in any way.

Our invention is extremely simple in construction yet very effective in operation. With respect to its operation it might be noted that most fishermen are apt to keep their car motor running a good deal of the time so that they can use the car as a warming house, and therefore it is very economical to merely operate ring heater 10 from the car battery.

It will be obvious to those skilled in the art that our invention may be modified by many substitutions and equivalents and that this disclosure is intended to be illustrative only; therefore, we intend to be limited solely by the scope of the appended claims.

What we claim is:

1. A buoyant ring heater for keeping ice fishing holes open comprising a ring-shaped tubular casing enclosing an annular chamber, a snout being in fixed water-tight relationship with said casing and projecting generally upwardly and outwardly therefrom to define an inlet into said chamber, and a heater comprising a resistance-wire loop disposed in said chamber and lead-in wires extending through said snout and in electrical connection with said loop, said ring heater including said casing and snout and heater being buoyant in water with said casing being adapted to float at the surface of the water.

2. The structure defined in claim 1 in further combination with a generally ring-shaped tubular electrical-insulating liner adjoining the inner surface of said casing.

3. A buoyant ring heater for keeping ice fishing holes open comprising an open-ring shaped tube with its opposite ends disposed adjacent each other, a T fitting connected to the ends of said tube in fluid-tight relationships and defining with said tube an annular chamber, the lateral leg of said T projecting generally upwardly and outwardly and defining an inlet into said chamber, a heater comprising a resistance-wire loop disposed in said chamber and lead-in wires extending through said lateral leg and in electrical connection with said loop, and a removable sealing cap at the outer end of said lateral leg encompassing said lead-in wires and said outer end of the lateral leg in fluid-tight relationships to form a water-tight closure of the inlet into said chamber, said ring heater being buoyant in water with said tube being adapted to float at the surface of the water.

4. The structure defined in claim 3 in further combination with a generally ring-shaped tubular electrical-insulating liner adjoining the inner surface of said tube.

References Cited in the file of this patent

UNITED STATES PATENTS

| | | |
|---|---|---|
| 1,018,558 | Hadaway | Feb. 27, 1912 |
| 2,514,559 | Riemenschneider | July 11, 1950 |
| 2,561,932 | Landgram | July 24, 1951 |